March 12, 1963 J. M. HOVEY ETAL 3,081,405

GATED AMPLIFIER WITH POSITIVE FEEDBACK

Filed Aug. 31, 1959

INVENTORS
JOHN M. HOVEY
FREDERICK C. HALLBERG

BY Richard C. Reed

ATTORNEY

United States Patent Office 3,081,405 Patented Mar. 12, 1963

3,081,405

GATED AMPLIFIER WITH POSITIVE FEEDBACK

John M. Hovey, Oxon Hill, and Frederick C. Hallberg, Silver Spring, Md., assignors to the United States of America as represented by the Secretary of the Navy Filed Aug. 31, 1959, Ser. No. 837,296
1 Claim. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates to gated amplifiers. More particularly the invention relates to a novel gated transistor amplifier which is particularly useful in computer and related pulse signal circuits.

The invention is concerned principally with computers of the type where information is represented by the presence or absence of a pulse in each of a number of preselected time intervals. Such computers generally contain a master clock which establishes the preselected time intervals by simultaneously enabling or disabling certain circuits in various parts of the computer. As the information pulses pass between these circuits, however, they are subjected to unavoidable delay and attenuation. Further, such circuits are unduly affected by temperature changes. As a result the shape and amplitude of the pulses are altered until these pulses are no longer capable of controlling the circuits to which they are applied.

It is, therefor, necessary to provide a means for correcting the shape and amplitude of the pulses in various signal paths of the computer. Such a means would be capable of amplifying, widening, narrowing or otherwise reshaping the pulse in addition to synchronizing the time position of the pulse with the control signals from the master clock. Since these circuits are frequently employed in mobile units, it is desirable that the circuit be rugged, compact, reliable, light-weight and efficient as regards power consumption and unaffected by a wide temperature range.

An object of the present invention is, therefor, to provide a circuit having the desirable properties set forth above which is simple and inexpensive.

A further object of the invention is to provide a transistorized computer pulse-forming circuit which is triggered by information pulses in which the shape and time position of the output pulses are controlled by clock pulses.

It is another object of this invention to provide a transistorized pulse-forming circuit which is capable of giving the controlled delay required for a shift register.

Other objects and advantages of this invention will hereinafter become more fully apparent from the following description of the annexed drawings, which illustrate a preferred embodiment, and wherein.

Briefly, the circuit of this invention is a gated amplifier; which is, in effect, a gated blocking oscillator. Two transistors are arranged in the configuration of an "and" circuit with a trigger being fed to one input and a clock to the other. Feedback is applied to the trigger input. When a trigger pulse of any width is applied in coincidence with the clock, an output is generated; if the trigger is narrower than the clock pulse, the feedback will hold the amplifier on. The transistors will turn off when the clock wave form returns to zero voltage, thereby quantizing all inputs to the width of the clock. It is apparent that this element can be used as a shift register stage. The output of this element is taken from a transformer and the overshoot thereof will fall in a second clock pulse 180° phase delayed from the first clock pulse, thereby giving the controlled delay required for shift register action. This circuit is designed for use with silicon transistors, such as Philco 2N496, and will operate over a temperature range from minus sixty-five degrees centigrade to plus eighty-five degrees centigrade and with a voltage variation of plus or minus twenty percent at the extremes.

Figure 1:
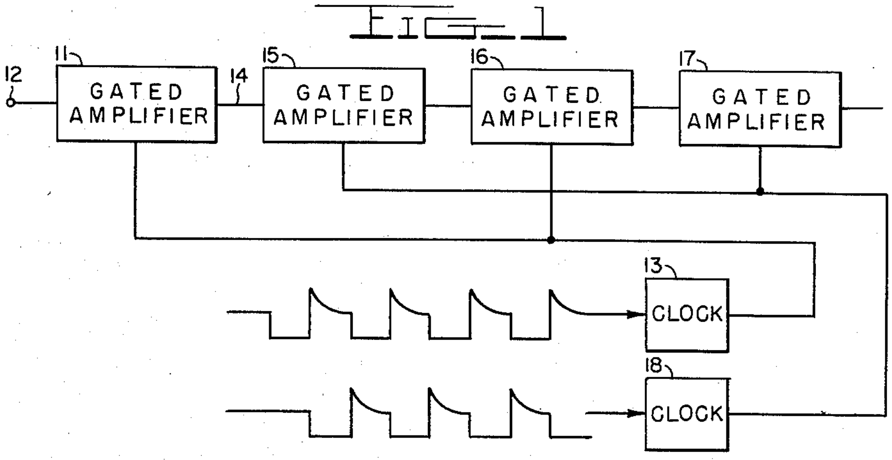
FIG. 1 shows, in block diagram, a shift register which includes a plurality of gated amplifiers constructed in accordance with this invention.

Referring now to the drawings, wherein like reference characters designate like or corresponding parts throughout the several views, there is shown in FIG. 1 a shift register constructed in accordance with the present invention.

Figure 2:
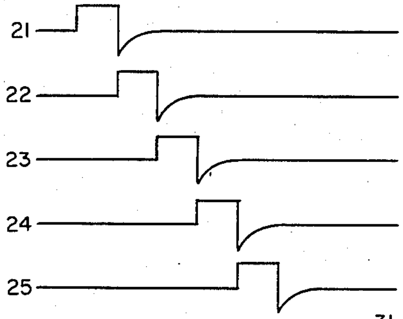
FIG. 2 is an idealized showing of the wave forms of the operation of the circuit of FIG. 1.

To a first gated amplifier 11 are applied input 12, which is represented by the signal 21 of FIG. 2, and also the clock 13. The output of gated amplifier 11 is applied to gated amplifier 15 from output 14 shown as signal 22 in FIG. 2. Also applied to gated amplifier 15 is clock 18 which is shown with its clock pulse being 180° phase delayed from the clock pulse of clock 13. The output of gated amplifier 15 is shown as signal 23 in FIG. 2 and is applied as the input of gated amplifier 16. The outputs of gated amplifiers 16 and 17 are shown as signals 24 and 25, respectively.

The shift register shown in FIG. 1 operates in response to the simultaneous applications of input and clock signals. With alternate stages of the register connected to a first clock and the remaining stages connected to a second clock, the input pulse which is applied simultaneously with a clock pulse to the first stage is then transferred to the other stages in shift register manner.

Figure 3:
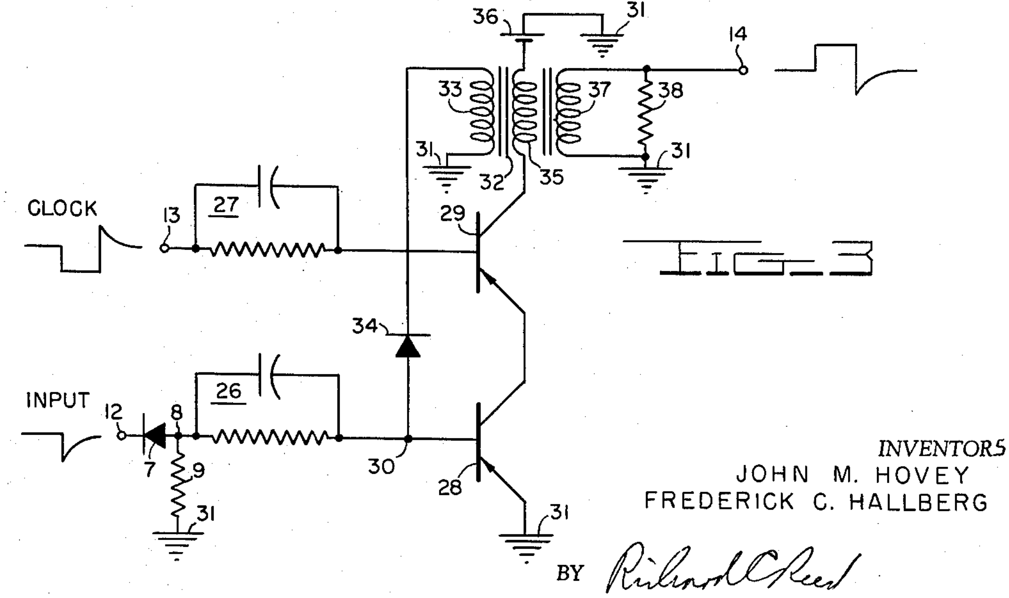
FIG. 3 shows the details of the gated amplifier of this invention.

FIG. 3 shows the details of the gated amplifier circuitry. The input signal is applied to terminal 12 through unidirectional element 7, junction 8, pulse sharpening circuit 26, junction 30 to the base of PNP transistor 28. Also connected at junction 8 is a resistor 9 to the common return 31. Unidirectional element 7 is provided to isolate feedback from the driving circuit, thereby eliminating any possibility of triggering the transformer in the previous stage. The resistor 9 is provided for a return path for the unidirectional element 7 to prevent the storage of a charge there across. The circuit 26 is provided to sharpen the input pulse so as to eliminate any phase delay which might be introduced into the circuit. The emitter of transistor 28 is connected to ground 31. The collector of transistor 28 is connected to the emitter of PNP transistor 29. A clock pulse is applied to the base of transistor 29 through terminal 13 and pulse sharpening circuit 27. The collector of transistor 29 is connected to one end of a winding 35 on a transformer core 32. The other end of winding 35 is connected to the negative side of a power source 36 whereas the positive side is connected to a common return 31. A second winding 33 on transformer 32 is connected at one end to the common return 31 and at its other end to the unidirectional element 34. The other side of unidirectional element 34 is connected to junction 30. An output circuit is provided transformer core 32 which includes a third winding 37 which is connected at one end to the common return 31 and at the other to output terminal 14. A damping resistor 38 is connected across winding 37 to provide critical damping of the overshoot of the transformer, thereby eliminating ringing.

It is to be noted that the waveform at output terminal 14 is identical with the wave form of the clock applied at terminal 13 with the exception of the reversal of polarity. In the operation of the gated amplifier as shown in FIG. 3, it is necessary that the clock pulse and the input pulse are applied simultaneously. The input need not be of the same duration as the clock pulse since a feedback loop, including diode 34, is provided to maintain a signal on the input transistor 28 during the application of the clock signal on the base of transistor 29. When both of the transistors 28 and 29 are cut on by the presence of signals applied to the bases thereof, the power source 36 causes current to flow through the winding 35 of the tranformer and an output is provided at 14.

If desired, a plurality of unidirectional elements 7 can be connected to junction 8 for mixing a plurality of input signals.

When collector current flows in transistor 29, the primary winding 35 of the transformer is energized and pulses are induced in both the output and feedback windings. The feedback winding is polarized to generate a negative pulse which passes through the diode 34 to augment the voltage on the base of transistor 28. This regenerative action not only increases the amplification of the output amplifier, but also extends the period over which the amplifier is conducting.

Thus, with width of the output pulse is determined only by the width of the clock pulse. This makes triggering of the circuit by the input, or information, pulses less critical. The information pulse need only occur slightly before and after the initiation of the clock pulse. It is, therefore, permissible to use the narrow negative overshoot of the information pulses, as shown in the drawing, rather than the wider, but lower amplitude, positive portion of these pulses. When the time position of the information pulses is not accurately determinable or varies, it may be desirable to use the wider positive portions. A similar circuit for positive information pulses is obtained by using npn type silicon transistors and reversing the polarities throughout the circuit.

This invention is related to an invention by one of the instant inventors, Frederick C. Hallberg, which is disclosed in his copending application entitled Gated Amplifier, Serial Number 780,644, filed December 15, 1958.

Since many variations of the specific embodiment described above will occur to those skilled in the art, the invention is to be limited only as specified in the following claim.

This invention is an improvement over the said copending application by the more rapid cut-off of the current flowing through the transformer, since there is far less leakage of current through the collector and the base of the transistor 29.

What is claimed is:

A gated amplifier with positive feedback comprising, first and second transistors each having a base, collector, and emitter, the collector of said first transistor being directly connected to the emitter of said second transistor, a load impedance and a current source serially connected between the collector of said second transistor and the emitter of said first transistor to form a series connection of said transistors, first and second signal input terminals, means connecting said first and second input terminals to the bases of said first and second transistors respectively, and positive feedback means connected only to said first transistor, said feedback means being connected between said load impedance and the base of said first transistor whereby positive feedback current flows only in said first transistor permitting rapid recovery of the amplifier at the end of its conducting cycle.

References Cited in the file of this patent

UNITED STATES PATENTS

| | | |
|---|---|---|
| 2,676,251 | Scarbrough | Apr. 20, 1954 |
| 2,831,126 | Linvill et al. | Apr. 15, 1958 |
| 2,835,828 | Vogelsong | May 20, 1958 |